P. Miller,
Bee Feeder.
No. 88,058. Patented Mar. 23, 1869
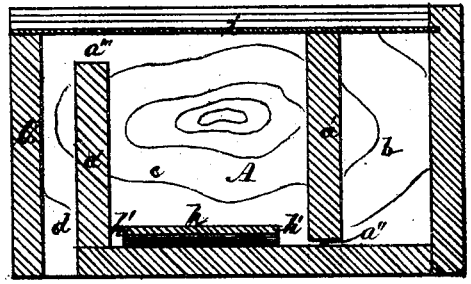
Witnesses:
S. S. Fahnestock
C. C. Brown.
Peter Miller
Inventor by
Geo. E. Brown.
Atty

UNITED STATES PATENT OFFICE.

PETER MILLER, JR., OF FREDONIA, NEW YORK.

Letters Patent No. 88,058, dated March 23, 1869.

IMPROVEMENT IN BEE-FEEDERS.

The Schedule referred to in these Letters Patent and making part of the same.

*To all whom it may concern:*

Be it known that I, PETER MILLER, Jr., of Fredonia, in the State of New York, have invented a new and useful Improvement in Bee-Feeders; and I do hereby declare that the following is a full, clear, and exact description of the same, reference being had to the accompanying drawing, and letters of reference marked thereon, making a part of this specification, in which the figure is a cross section.

To enable those skilled in the art to make and use my invention, I now proceed to describe its construction and operation.

Similar letters, in the drawing, refer to like parts.

This invention belongs to that class of devices called bee-feeders, which is represented by a wooden box, having one or more compartments for the feed, and another compartment for the bees to eat in, all of which compartments are covered by a glass slide; and It consists in providing a passage under the partition, between the feed-compartment and the eating-compartment, under which the feed may flow from the former to the latter.

Also, in providing, within the outside wall of the box, and beneath the glass cover, a passage by which the bees may enter the feeding-chamber, said passage being so arranged as to be always open.

Also, in providing the float within the feeding-chamber, on which the bees stand as they eat, with projections from each end and side, for the purpose of always preserving a space between all parts of the said float and the walls of the feeding-chamber, for the convenience of the bees in eating; all of which will hereinafter more fully appear.

A represents a wooden box, of any desired size. A depth of two and a half inches, a width of four inches, and a length of five inches, are suggested as suitable proportions.

$a$ $a^1$ represent partitions, dividing the interior of the box A into the receiver $b$, in which the feed is first placed, the feeding-chamber $c$, and the passage $d$, by which the bees enter.

As seen in fig. 2, there is a passage, $a^2$, between the under side of the partition $a$ and the bottom of the box A, the purpose of which is to enable the feed in the receiver, which is generally of a semi-liquid nature, to flow into the feeding-chamber $c$ as fast as it may be needed.

$h$ represents a small wooden float, placed within the feeding-chamber, which rests upon the feed, and prevents the bees from becoming stuck therein.

The said float is provided at each end and each side with projections $h'$, of tin, wire, or wood, the function of which is to preserve the feeding-space at all points of the float, by preventing the same from coming in contact with the walls of the feeding-chamber.

The compartments are covered with a glass slide, $i$. As seen in fig. 2, the said slide is in immediate contact with the upper side of the partition $a$, so as to entirely close the compartment $b$ at the top. When feed is to be introduced into the receiver $b$, the glass slide $i$ should be drawn back only as far as the partition $a$, so as to prevent the bees from gaining access to the said receiver.

As seen at fig. 3, there is a space, $a^3$, between the glass cover $i$ and the top of the partition $a^1$, which space opens into the passage $d$ between the partition $a^1$ and the side $b$ of the box, which latter comes up close to the under side of the glass slide. The passage $a^3$ enables the bees to enter the feeding-chamber, and is always open.

It is thus apparent that the bees can at all times enter or depart from the feeding-chamber without difficulty, and that it is impossible for them to enter the receiver $b$, except when the latter is entirely empty.

Having thus described my invention,

What I claim as new, and desire to secure by Letters Patent, is—

The box A, provided with the partitions $a$ $a^1$, the chambers $b$ $c$, the passages $d$ $a^2$ $a^3$, and the float $h$, substantially as described.

PETER MILLER. JR.

Witnesses:
J. B. ARCHIBALD,
M. S. SNOW.